US007096484B2

(12) United States Patent
Mao et al.

(10) Patent No.: US 7,096,484 B2
(45) Date of Patent: Aug. 22, 2006

(54) DIGITAL TV SYSTEM WITH SYNCHRONIZED WORLD WIDE WEB CONTENT

(75) Inventors: Weidong Mao, Princeton, NJ (US); David Chen, Ivyland, PA (US)

(73) Assignee: TVWorks, LLC, Philadelpha, PA (US)

( * ) Notice: Subject to any disclaimer, the term of this patent is extended or adjusted under 35 U.S.C. 154(b) by 356 days.

(21) Appl. No.: 10/259,347

(22) Filed: Sep. 28, 2002

(65) Prior Publication Data

US 2003/0115612 A1 Jun. 19, 2003

Related U.S. Application Data

(63) Continuation of application No. 09/124,572, filed on Jul. 29, 1998, now Pat. No. 6,886,178, which is a continuation-in-part of application No. 09/053,562, filed on Apr. 1, 1998, now Pat. No. 6,459,427.

(51) Int. Cl.
   *H04N 5/445* (2006.01)
(52) U.S. Cl. ............................. 725/52; 725/51; 725/112
(58) Field of Classification Search ................ 715/723; 725/112, 148, 131, 139, 152; 455/3.03, 3.04; 709/217–219; 348/473, 52
   See application file for complete search history.

(56) References Cited

U.S. PATENT DOCUMENTS

| | | | | |
|---|---|---|---|---|
| 5,694,163 A | * | 12/1997 | Harrison | 725/110 |
| 5,818,441 A | * | 10/1998 | Throckmorton et al. | 715/717 |
| 5,818,935 A | * | 10/1998 | Maa | 380/200 |
| 5,929,849 A | * | 7/1999 | Kikinis | 725/113 |
| 5,929,850 A | * | 7/1999 | Broadwin et al. | 725/110 |
| 5,982,445 A | * | 11/1999 | Eyer et al. | 348/461 |
| 5,987,518 A | * | 11/1999 | Gotwald | 709/230 |
| 6,018,714 A | * | 1/2000 | Risen et al. | 705/4 |
| 6,049,831 A | * | 4/2000 | Gardell et al. | 709/236 |
| 6,052,715 A | * | 4/2000 | Fukui et al. | 725/114 |
| 6,256,785 B1 | * | 7/2001 | Klappert et al. | 725/136 |
| 6,407,998 B1 | * | 6/2002 | Polit et al. | 370/365 |
| 6,912,726 B1 | * | 6/2005 | Chen et al. | 725/113 |

* cited by examiner

*Primary Examiner*—Victor R. Kostak
(74) *Attorney, Agent, or Firm*—Patterson & Sheridan, LLP (57) ABSTRACT

In a one way broadcast digital video network, Internet HTML Web page data is formatted to fit within a standard MPEG-2 data packet structure, and multiplexed along with other MPEG-2 digital video signals for transport within a multiple channel digital video system. In particular, the headend server broadcasts a rotating carousel comprising an ensemble of Web pages in HTML format. The rotating carousel contains both broadcast Web pages and simulcast Web pages and a control map permitting the viewer to navigate among the HTML Web pages of the rotating carousel. In particular, the control map contains the locations of the HTML Web pages in the rotating carousel that correspond to broadcast Web pages. The control map further contains the locations of the HTML Web pages in the rotating carousel that correspond to simulcast Web pages. The control map is updated and rebroadcast whenever there is a change at the start, middle or end of a broadcast video program, thereby synchronizing the simulcast Web pages to the multiple channel broadcast digital video programs.

16 Claims, 6 Drawing Sheets

DIGITAL TV SYSTEM WITH SYNCHRONIZED WORLD WIDE WEB CONTENT

RELATED APPLICATIONS

This is a continuation of application Ser. No. 09/124,572, filed on Jul. 29, 1998 now U.S. Pat. No. 6,886,178.

This is a continuation in part of U.S. patent application Ser. No. 09/053,562, filed Apr. 1, 1998 now U.S. Pat. No. 6,459,427.

1. Field of the Invention

This invention relates to the field of communication, and more particularly, to the convergence of broadcast television and interactive communication on the World Wide Web portion of the Internet.

2. Background of the Invention

Linking broadcast television programs to the Internet has been discussed in the prior art. One desired feature is to be able to switch back and forth between a broadcast program and a related Internet site on the World Wide Web. In such manner, normally passive broadcast television becomes an interactive medium.

To access a related Internet site content, the viewer pushes a button on the remote control or clicks a pointing device on an icon on the screen. The user may switch back and forth between Internet content and broadcast content. A typical pointing device for user interface, may consist of either a mouse, track ball, cursor buttons or like type of device. In such manner, the viewer may switch from one Internet site to another during the broadcast program.

Internet content may also be overlaid on broadcast content. World wide web content may be displayed in a window while the broadcast content is still being displayed (picture in picture). Alternately, a transparency such as text may be overlaid on the broadcast television image. In such manner, the viewer simultaneously views broadcast video and interactive Internet content.

Many television programmers (content providers) already have both a video channel and a web site. An application of particular interest to such programmers is to link their video channel and their web site. Linking broadcast video to another medium is sometimes called "simulcasting" after the practice of linking the audio program of a video channel to an FM stereo broadcast.

In some cases, such as a news channel (as for example, Cable News Network), the web site (http://www.cnn.com) represents an alternate form of substantially the same or similar content as contained in the broadcast video channel. In other cases, such as a music or movie channel, the web site represents a supplement to the content of the video channel. The web site may deliver scheduled programming times, additional advertisements, and catalog style ordering of merchandise related to the broadcast video content. Thus, a music channel can sell compact discs of the current music video selection. A shopping channel can provide additional product information relating to the item on sale. In general, a programmer's web site can supplement and expand upon its broadcast video material.

The ability to provide a wealth of product details is of particular interest to advertisers includes providing more detailed information about the product being advertised. An automobile advertisement, for example, may contain an icon representing the automobile manufacturer. Clicking on the auto manufacturer's icon takes the viewer to the web site of the manufacturer, for additional product information.

Although the goal of linking broadcast television and interactive Internet access is known, the implementation of a practical system is a technical challenge. Typically, to link a broadcast television video signal to a specified Internet address, a uniform resource locator (or URL) is formatted onto a tag inserted into the broadcast television signal by the broadcaster (i.e., by the programmer, advertiser or content provider). The inserted tag defines the Web page and identifies the URL where the related Internet information is located. The requirement of a tag in the broadcast television signal, in turn requires that a universal standard as to location and format of the tag be adopted.

Also, other attempts at providing Internet access over MPEG-2 digital TV, involve first decoding the Internet World Wide Web HTML page into a page of video, then encoding page of video into MPEG-2 format, and then broadcasting the MPEG-2 formatted Web pages over the digital TV network. Encoding pages of video into MPEG-2 requires the broadcast source have one or more MPEG-2 encoders. It would be desirable to provide a system that transmits Internet World Wide Web pages without requiring an MPEG encoding process at the broadcast headend.

Decoding HTML pages to video and then into MPEG-2 also means that the MPEG-2 decoder at each viewer location is occupied whenever it is decoding MPEG-2 encoded Web page video. Thus, in the prior art, in order to view both broadcast video and Internet content simultaneously, two MPEG-2 decoders would be required at the viewer location. It would be desirable to provide a system that permits Internet World Wide Web pages and MPEG-2 broadcast video to be displayed without requiring a second MPEG-2 decoder.

Furthermore, Internet connectivity typically requires two way data paths. The return path is used to transmit viewer selections such as mouse clicks and typed commands. At the present time only 15% of the cable television (CATV) systems are capable of two-way transmission over the cable path. The majority of CATV systems remain one way transmission only. Another option for two-way Internet connectivity is to use the public switched telephone network as the return path. However, the use of the public switched network requires a telephone modem and also occupies the household telephone line. It would be desirable to implement interactive Internet access on a one way CATV network without a telephone connection.

Further, there is a latency problem associated with coupling broadcast video content to an Internet site. Selecting an icon before accessing the Internet may mean a long wait, because Internet access and connection must be established, and then the desired HTML page downloaded. That is, first the modem and Internet service provider must establish Internet access (via two way CATV or telephone return), then the connection to the desired web site must be established, and then the HTML page must be downloaded.

Even if the viewer is already connected to the Internet (via two-way CATV or telephone return) when an icon is selected, there may still be an unacceptably long wait for a selected Web page to appear. The waiting time results from establishing a connection through Internet switches from the viewer's home to the remote web site, and then downloading the HTML page. It would be desirable to implement interactive Internet access with a quick response time, not requiring establishment of Internet access, Internet connection and subsequent downloading from the remote web site.

Finally, there is a major traffic problem associated with coupling broadcast video content to a remote Internet web site. If even a small fraction of viewers of a mass-market advertisement clicked on the advertiser's icon, it would result in a deluge of simultaneous telephone connection requests at the advertiser's web site. To accommodate the huge number of requests would require an enormous amount of telephone line capability (and computing power to serve HTML pages) at the remote Internet web site. The resulting number of connection requests would overwhelm most web site traffic models which are designed to support an average number (not a peak number) of connection requests. Yet, coupling broadcast content to Internet content tends to encourage a peak number of simultaneous requests for connection.

It would be desirable to support a mass quantity of simultaneous Internet access requests without requiring an excessive number of simultaneous telephone connections at the remote Internet web site.

SUMMARY OF THE INVENTION

In accordance with the present invention, Internet HTML Web page data is formatted to fit within the standard MPEG-2 data packet structure, and multiplexed along with other MPEG-2 digital video signals for transport within a multiple channel digital video system. In such manner, the HTML protocol is preserved, and mapped to the MPEG-2 transport format, resulting in HTML in MPEG video channel.

In particular, the headend server broadcasts a rotating carousel comprising an ensemble of Web pages in HTML format. The rotating carousel contains both broadcast Web pages and simulcast Web pages. Broadcast Web pages are of general interest to all viewers. Simulcast Web pages are related to the contents of the broadcast video programs contained in the digital video channels. Simulcast Web pages are of interest primarily to those viewing the related broadcast video program. The HTML pages may be accessed directly from the rotating carousel, or, depending on the amount of memory in the settop, some or all of the HTML Web pages may be locally stored in a high-speed cache memory in the settop for faster access.

To permit the viewer to navigate among the HTML pages in the rotating carousel (or from the local settop cache memory), a control map is broadcast in the MPEG-2 data stream. The control map consists of three types of tables. The first table is a master control map, in that the first table defines the locations of the second and third tables. The first table is termed the HTML Program Association Table or HPAT. The second and third tables respectively, are termed the HTML Program Map Table (HPMT), and the HTML Event Information Table (HEIT). The HTML Program Map Table contains the location of HTML Web pages in the rotating carousel that correspond to broadcast Web pages. The HTML Event Information Table contains the location of the HTML Web pages in the rotating carousel that correspond to simulcast Web pages. There is one HTML Event Information Table (HEIT) for each video channel, which HEIT associates at least one simulcast Web page in the rotating data carousel with that video channel.

First, the MPEG-2 decoder in the settop is synchronized with the MPEG-2 data stream as is normally done in MPEG-2 decoding. Then the settop looks for and downloads the HTML Program Association Table, which is found in a predetermined data packet within the MPEG-2 data stream format. The settop then uses the HTML Program Association Table to locate, download and store the other two tables, HPMT and HEIT. After the first, second and third tables are downloaded and stored, the settop is responsive to viewer commands to navigate through the broadcast Web pages, or the simulcast Web pages of the continuous rotating carousel.

Broadcast Web Pages

Broadcast Web sites are popular sites that are of interest to all viewers. Typical broadcast Web sites contain news, weather and sports, but can be any Web site of general interest to many viewers. The viewer selects an available broadcast Web site from a menu displayed on the TV.

To view a broadcast Web site such as the http://www.NYTimes.com, the HTML Program Map Table is used as a lookup table to find the MPEG-2 data packet within the MPEG-2 data stream corresponding to the NY Times web page. Location within the MPEG-2 data stream is defined by a packet identifier (PID), a table identifier (tableID) and table identifier extension (tableIDext). The settop monitors the rotating carousel until the designated MPEG-2 data packet location appears and then the HTML page data at that location in the MPEG-2 data stream is stored in the subscriber's settop and displayed on the television screen.

The home page at NYTimes.com will typically display links to other pages by designating a URL. As is normal for Internet navigation, the user clicks on, (or otherwise indicates a desire to select) a displayed link to another Internet page. To find the linked HTML pages, the designated URL is looked up in the HTML Program Map Table, which provides the location of the desired HTML page in the MPEG-2 data packet within the MPEG-2 data stream corresponding to the designated URL web page. The rotating carousel will normally contain all or most of the linked page URLs. As indicated, a location within the MPEG-2 data stream is defined by a packet identifier (PID), a table identifier (tableID) and table identifier extension (tableIDext). The settop monitors the rotating carousel until the designated MPEG-2 data packet location appears and then the HTML page data at that location in the MPEG-2 data stream is stored and displayed.

Simulcast Web Pages

To view a simulcast Web site such as http://www.toyota.com, during a Toyota commercial, the HTML Event Information Table for the corresponding video channel is used as a lookup table to find the MPEG-2 data packet within the MPEG-2 data stream corresponding to the Toyota web page. The settop monitors the rotating carousel until the designated MPEG-2 data packet appears which is then stored and displayed. The content of the HTML Event Information Table is synchronized to the broadcast video program.

Whereas the available broadcast Web pages are changed relatively infrequently (by changing the content of the HPMT) the available simulcast Web pages are changed (by changing the content of the HEIT) relatively frequently, whenever the corresponding broadcast video program changes.

The home page at Toyota.com will typically display links to other pages by designating a URL. As with broadcast web pages, links to other URLs in simulcast web pages are looked up in the appropriate table. In the case of simulcast Web pages, the HTML Event Information Table, HEIT is used to find the linked HTML pages. The designated URL is looked up in the HEIT table, which provides the location of the desired HTML page in the MPEG-2 data stream corresponding to the designated URL web page. As indicated above, the settop monitors the rotating carousel until the designated PID, tableID and tableIDext appears in the MPEG-2 data stream, and then the HTML page data at that location in the MPEG-2 data stream is stored and displayed.

The content of the HTML Event Information Table defines the links between broadcast video programs and related Web sites. Broadcast video may have advertising and/or entertainment content, and a video broadcast program content provider may be either a programmer and/or an advertiser. The event information and its relationship to locations on the World Wide Web is obtained in individual communications sessions at the broadcasting station established over the Internet and then down loaded into each settop through the HTML Event Information Table. In particular, in the case of CATV, the headend communicates with the individual web sites of each broadcast video content provider to obtain the relationship between broadcast video program content and corresponding web pages in the rotating carousel.

Local Tags

In another embodiment of the present invention, for events that cannot be prescheduled (into a predetermined event information table), a local tag is inserted by the programmer into the video signal provided to the headend. The inserted local tag is inserted by the programmer, and subsequently received at the headend when it is desired by the programmer to initiate a simulcast connection between the its video signal and a given HTML Web page. The HTML Event Information Table is generated in response to the local tag, and downloaded to the settop.

By combining digital television transmission in MPEG-2 format with web pages in HTML format, bandwidth is dynamically assigned to accommodate the required number of web pages in the rotating carousel. The longest latency for retrieving a desired web page is the time for one rotation of the carousel.

DETAILED DESCRIPTION

Figure 1:
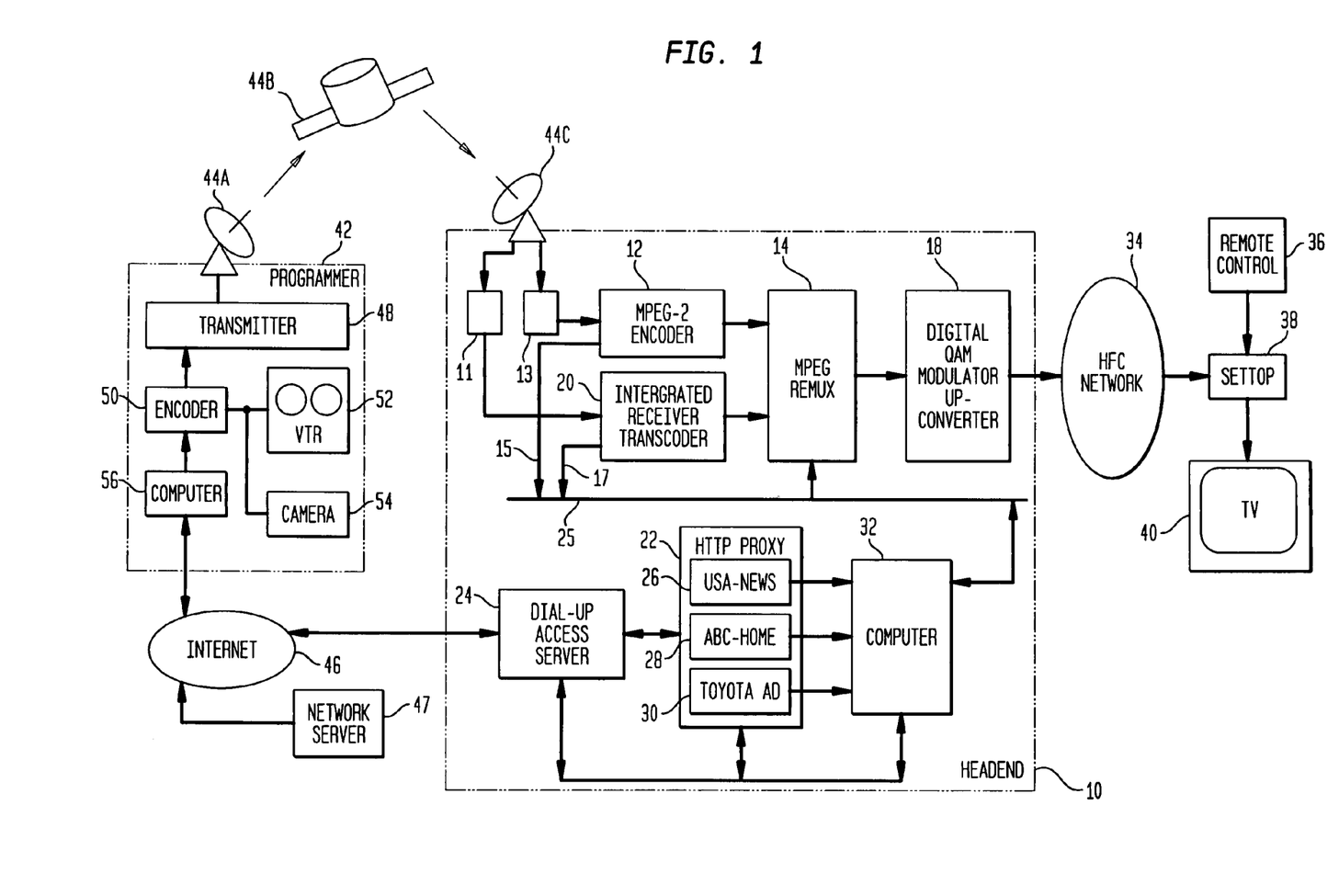
FIG. 1 is a block diagram of a broadcast video system embodying the present invention FIG. 2 a protocol stack illustrating an embodiment for formatting HTML within an MPEG-2 stream.

An overview of a system in accordance with the present invention is shown in FIG. 1. A broadcasting station 10, (in this case a CATV cable headend), transmits World Wide Web pages over a one way digital video broadcast network (in this case a hybrid fiber coaxial CATV network 34), to a digital settop 38. The viewer controls what the settop 38 displays on a local television receiver 40, via a remote control input device 36.

Although the preferred embodiment is shown in the context of a CATV system, the present invention applies to any broadcast communications system, including without limitation, conventional VHF and UHF, direct broadcast satellite (DBS), multipoint microwave distribution systems (MMDS), and the like. For example, in the case of a DBS system, the broadcasting station would be the satellite uplink center, and the settop would be the satellite receiver decoder.

The headend 10 includes a satellite receiving dish antenna 44C, coupled to an analog receiver 11 and a digital receiver 13, which downlink satellite delivered 44B signals. The analog receiver 11 is coupled to an integrated receiver transcoder 20 that provides MPEG-2 encoded signals to an MPEG-2 remultiplexer 14. The digital receiver 13 is coupled to an MPEG-2 encoder 12 that provides MPEG-2 encoded signals to the MPEG-2 remultiplexer 14. The output of the MPEG-2 remultiplexer 14 is coupled to a digital quadrature amplitude modulation (QAM) modulator/up converter 18, which transmits a digital video MPEG-2 data stream on HFC network 34.

The headend 10 also includes a proxy server 22 coupled to an Internet dial up access server 24 and a computer 32 coupled to the MPEG-2 remultiplexer 14 via a local area network connection or data bus 25. The MPEG-2 encoder 12 is also coupled to the network 25 to provide information on received analog video local tags to computer 32. Similarly, the integrated receiver transcoder 20 is coupled to the network 25 to provide information on received digital video local tags to computer 32. The use of received video local tags as an alternate embodiment of the present invention is described below.

A programmer 42 participates in the system by communicating via the Internet 46 to a network server node 47, and with the headend 10. A typical programmer has a satellite uplink antenna 44A coupled to a transmitter 48. An encoder 50 provides digital or analog signals as input to the transmitter 48, from such sources as video tape recorder 52 or camera 54. Additionally, typical programmers 42 receive downlinked signals (not shown) from other sources such as satellites, fiber optic cables or microwave links. In order to coordinate simulcast Web pages with the programming uplinked by programmer 42, a computer 56 is coupled via the Internet 46 to a network server node 47, and to the headend 10.

In operation, programmer 42 communicates the Web page addresses that are related to its broadcast 44A programming in communication sessions over the Internet 46, either via the network server 47, or directly to the headend 10. Headend 10 stores the simulcast Web pages, such as the ABC home channel 26, or a Toyota ad 30 in the http proxy server 22. In addition to simulcast Web pages, the headend 10 stores broadcast Web pages such as USA-news in the http proxy server 22.

Once the headend 10 has all the information necessary relating to simulcast and broadcast Web pages, computer 32 generates the control map, the HTML pages and the URLs for insertion into the industry standard transport layer of the MPEG-2 protocol in accordance with the present invention.

Figure 2:
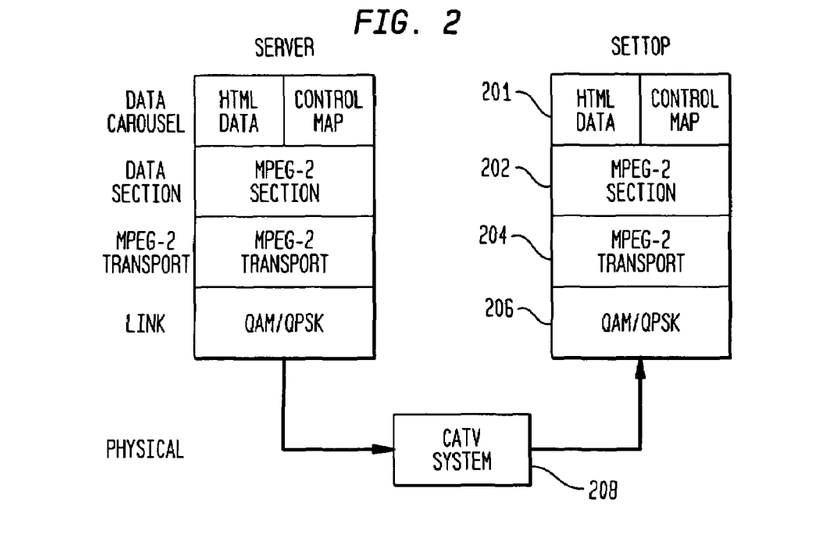
Figure 3:
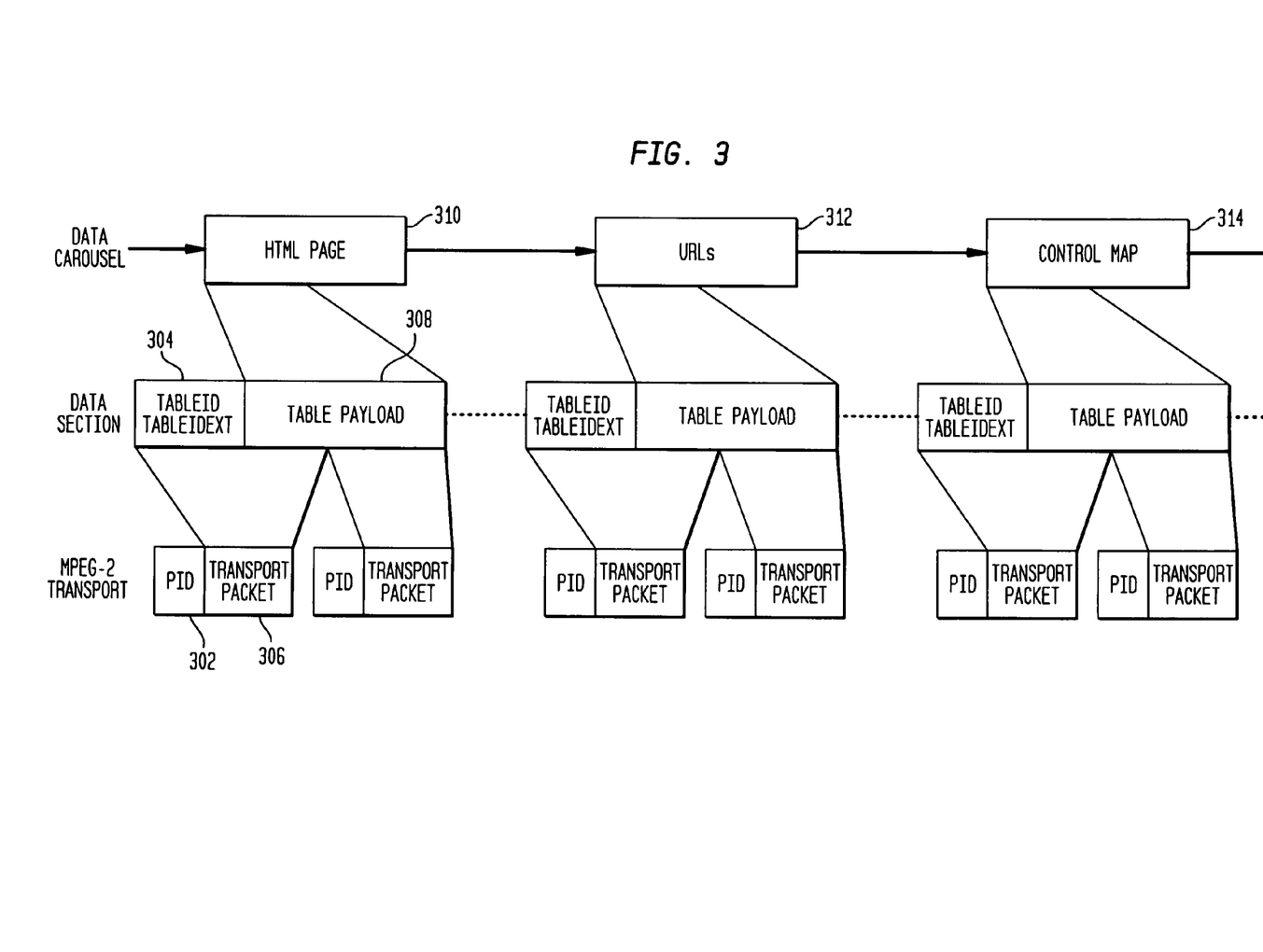
FIG. 3 is a block diagram illustrating a method for mapping HTML data over an MPEG-2 stream.

The protocol stack illustrating the layering of HTML on MPEG-2 is shown in FIG. 2. At the physical level is the CATV system 208 (or other broadband broadcast medium such as satellite etc.) The link layer modulation scheme is QAM/QPSK (quadrature amplitude modulation/quadrature phase shift keyed). Above the link layer 206, is the standard MPEG-2 transport layer 204. The data section 202 is the packet payload of the MPEG-2 transport, and the data carousel layer 201 contains the HTML data and control map. The nesting of the layers of the protocol stack is further illustrated in the timing diagram of FIG. 3.

The MPEG-2 transport layer is composed of a packet identifier, PID 302 and a Transport Packet 306. The content of the Transport Packet 306 is a portion of the Data Section (202 in the protocol stack of FIG. 2). The Data Section (which is part of the MPEG-2 protocol) is in turn composed of a tableID and tableIDext 304, followed by a table payload 308. The content of table payload 308 is a portion of the data carousel (201 in the protocol stack of FIG. 3). The data carousel carries the HTML Web pages 310, URLs 312 and the control map 314 of the present protocol.

Figure 4:
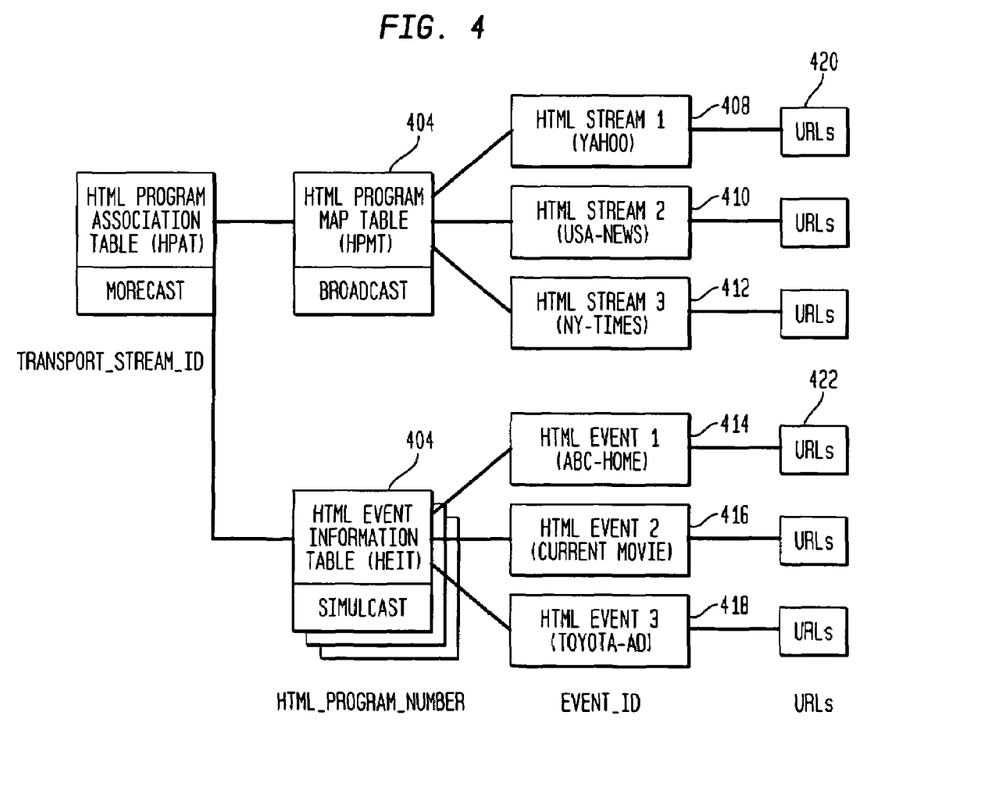
FIG. 4 is a block diagram of the control map architecture in accordance with the present invention.

The relationship between the various tables of the control map to the broadcast and simulcast Web pages is illustrated in FIG. 4. The HPAT 402 is the control map of control maps in that the HPAT 402 locates the other two control maps, HPMT 404 (for broadcast Web pages) and HEIT 406 (for simulcast Web pages).

The HPMT 404 designates a plurality of broadcast Web pages within the rotating data carousel, such as Yahoo 408, USA-News 410 and NY times 412. Each of the designated broadcast Web pages contain other URLs 420 as links to other Web pages.

The HEIT 406 designates a plurality of simulcast Web pages within the rotating data carousel, such as ABC-home, 414, a current movie home page 416 and a Toyota ad 418. Each of the designated simulcast Web pages contain other URLs 422 as links to other Web pages.

Figure 5:
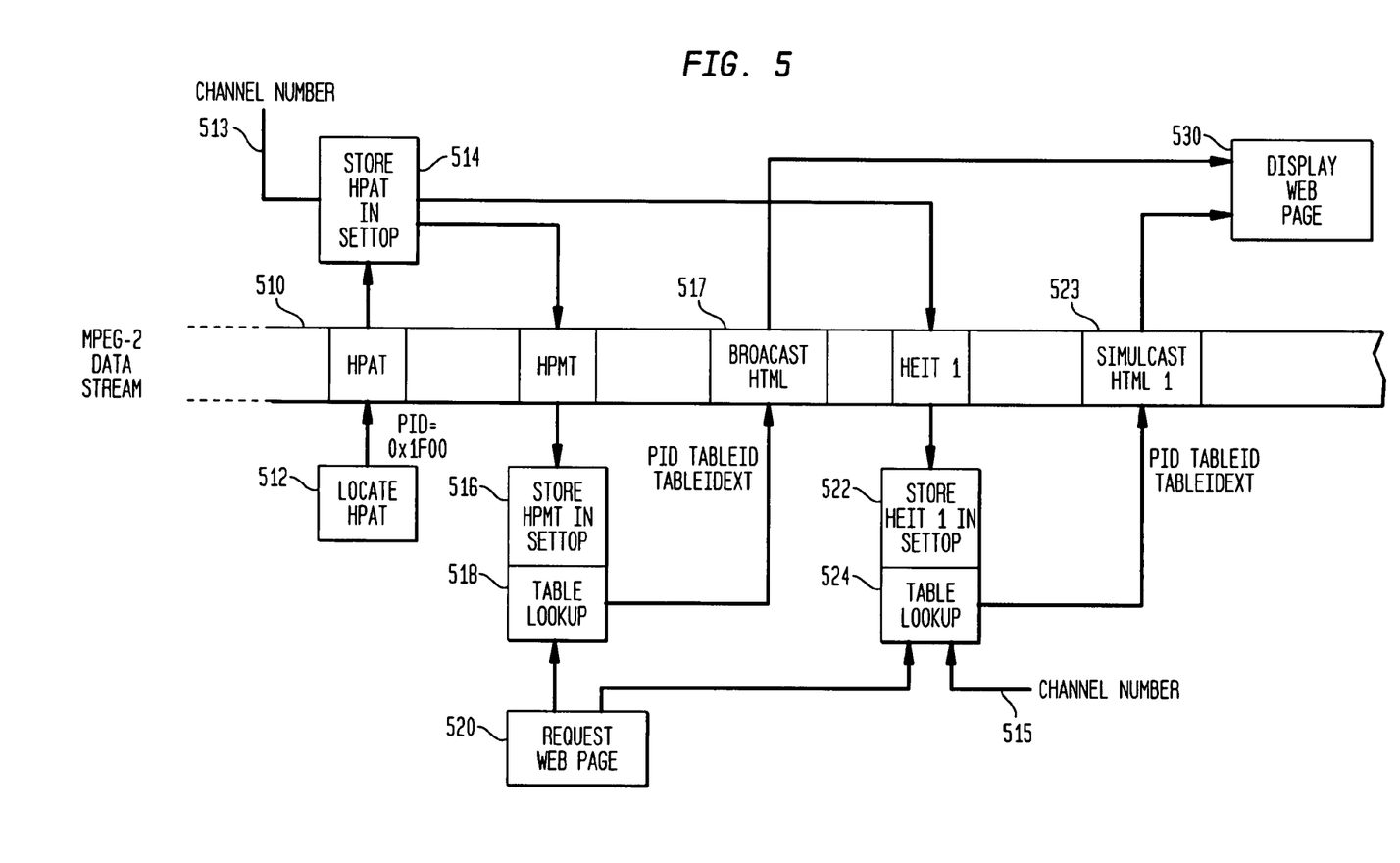
FIG. 5 is a timing diagram, partially in block form, illustrating a system for navigating among HTML pages formatted into an MPEG-2 stream.

The navigation in the settop provided by the control map to find a desired Web page within the MPEG-2 data stream is illustrated in FIG. 5. In particular, within the MPEG-2 data stream 510, there is a desired broadcast Web page HTML 517 and a desired simulcast Web page HTML 523.

To navigate to the desired Web page HTML 517, the settop first finds the HPAT (at a predetermined MPEG-2 location, for example, PID=0x1f00) at step 512. The HPAT is then stored in the settop at step 514. The settop uses the HPAT to locate the HPMT and stores the located HPMT at step 516. In response to a broadcast Web page request 520, a table lookup function 518 finds the PID, tableID and tableIDext needed to locate the desired broadcast HTML Web page 517 in the rotating data carousel of the MPEG-2 data stream. The located broadcast HTML page 517 is stored in the settop and displayed 530. The maximum latency of the system to find a given HTML Web page is the amount of time it takes the rotating carousel of HTML Web pages to repeat itself.

For simulcast, the settop uses the stored HPAT (in step 514) together with the current channel number input 513, to locate the necessary HEIT. In this case, HEIT 1 corresponds to the simulcast Web pages relating to the current channel number being viewed. The located HEIT 1 is then stored in the settop at step 522. All the other HEITs, for which there is one simulcast channel, are similarly located and stored.

In response to a simulcast Web page request 520, a table lookup 524 finds the appropriate PID, tableID and tableIDext in the stored HEIT 1, needed to locate the desired simulcast HTML 1 Web page 523 in the rotating data carousel of the MPEG-2 data stream. The located HTML simulcast page 523 is stored in the settop and displayed 530.

The content of simulcast HTML 1 Web page corresponds to the current channel being viewed. The current channel number is input 515 to the table lookup step 524. Each simulcast channel has one corresponding HEIT.

Figure 8:
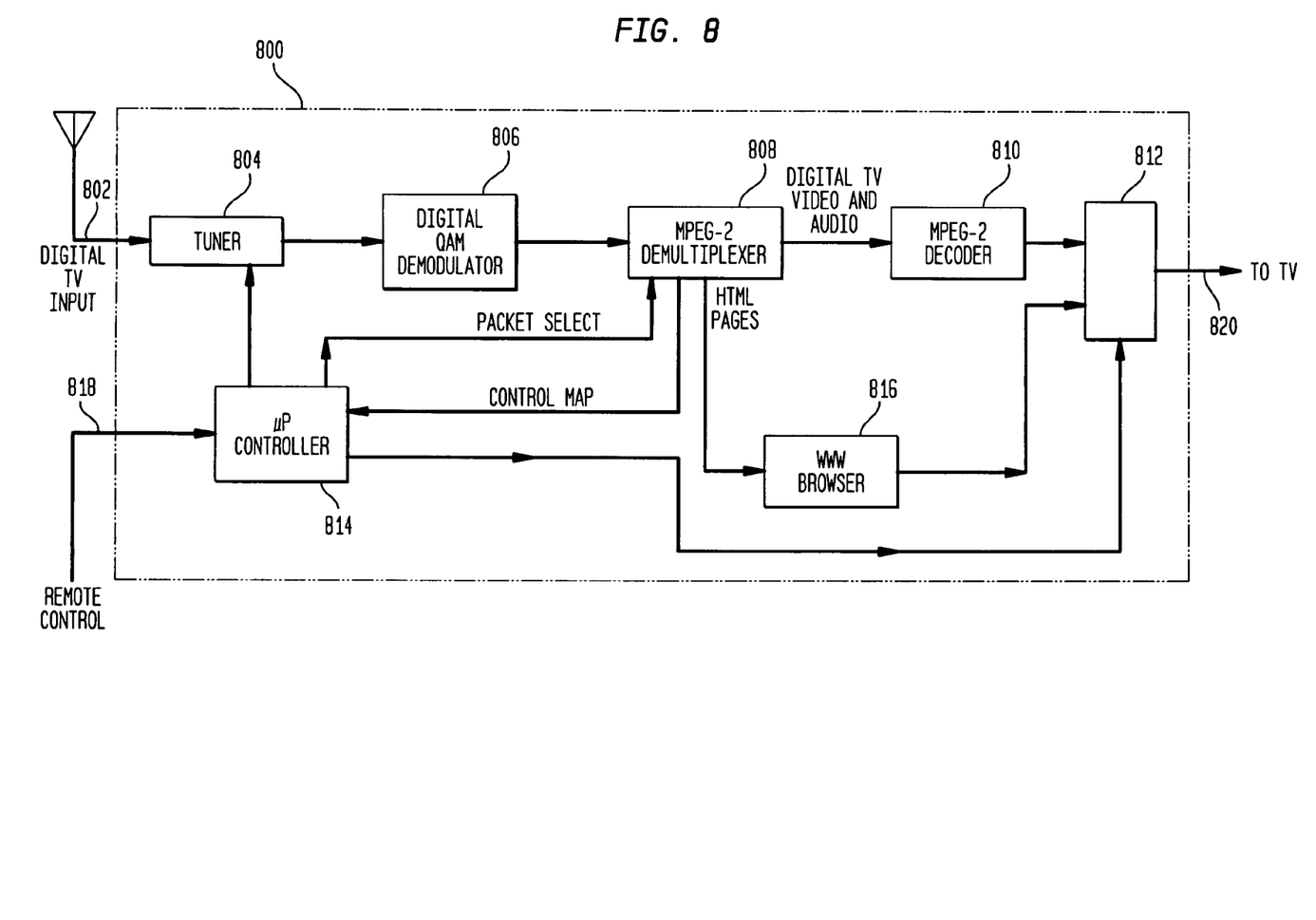
FIG. 8 is a block diagram of a settop decoder in accordance with the present invention.

A block diagram of a settop decoder for implementing the foregoing navigation scheme is shown in FIG. 8. The settop 800 includes a tuner 804 coupled to a digital QAM demodulator 806, coupled to an MPEG-2 demultiplexer 808 and thereafter to an MPEG-2 decoder 810. The settop 800 further includes a microprocessor controller 814 for coordinating navigation activities, and a World Wide Web browser 816 program for displaying HTML Web pages.

In operation, a digital television data stream 802 and remote control signals 818 are input to the settop tuner 800. Responsive to remote control inputs, microprocessor controller 814 directs tuner 804 to select a channel. The digital QAM demodulator 806 converts the input signal into a digital data stream to demultiplexer 808. The packet select output of controller 814, directs the demultiplexer 808 to a predetermined MPEG-2 location (PID=0x1f00) to selects the first control table (HPAT), which is stored in the memory of microprocessor controller 801.

Using the stored control table HPAT, microprocessor controller 814 determines the locations of the second and third control tables, HPMT and HEIT in the MPEG-2 data stream, and sets the packet select output to direct the demultiplexer 808 to the appropriate MPEG-2 data packets. The located HPMT and HEIT are stored in the memory of microprocessor controller 814. The viewer indicates a desired broadcast web page or simultcast web page via the remote control input 818 to microprocessor controller 814.

To find a desired World Wide Web page, microprocessor controller 814, looks up the PID, tableID and tableIDext in the stored control maps, and sends the corresponding packet identifying information to the MPEG-2 demultiplexer 808 via the packet select control line. The MPEG-2 demuliplexer 808 waits until the desired MPEG-2 data packet arrives in the rotating data carousel of HTML Web pages that correspond to the desired Web page, and then forwards the desired received World Wide Web page in HTML format to World Wide Web browser 816. The MPEG-2 demultiplexer 810 selects other MPEG-2 data packets to provide MPEG-2 digital video and audio to the settop MPEG-2 decoder 810.

Data Cache in the Settop

The present system permits a settop to navigate the HTML Web pages of the rotating carousel with little or no local memory storage. However, it is preferable to store downloaded HPAT and HEIT tables in the settop to speed up operation.

Faster response times are achievable by storing all or some of the rotating carousel in local cache memory in the settop. Without local storage of HTML Web pages in the settop, the longest latency for retrieving a desired web page is the time for one rotation of the carousel. With local storage of all the downloaded Web pages from the rotating carousel, the longest latency for retrieving a desired Web page is the access time of the local cache memory.

Between the two extremes of no storage at one end, and 100% local storage of the rotating carousel at the other end, there is a variety of partial storage options. One option is to use a high-speed cache to store a number of the most recently accessed Web pages. If the cache contains the desired Web page (a hit), then the cache memory is used in lieu of the rotating carousel. If the cache does not contain the desired Web page (a miss), then the rotating carousel is used to find the desired Web page.

The new Web page(s) are then stored in the high-speed cache (still in HTML format), displacing previously stored pages according to the memory logic of the cache. For example, the new Web pages may replace the least recently accessed Web pages. The present invention and the navigation control maps operate in the same way whether desired Web pages are accessed from high-speed cache memory or demultiplexed from the rotating carousel. A high-speed cache in the settop speeds up operation and reduces the latency period to select a desired World Wide Web page.

Since the selected World Wide Web page is already in HTML format after it is demultiplexed from the MPEG-2 data stream, World Wide Web browser 816 is able to generate a Web page display without the need for a second MPEG-2 decoder. Thus, the present system provides simultaneous digital video and Internet Web pages with only one MPEG-2 decoder 810.

Microprocessor controller 814 further provides for combining the simultaneous outputs of the MPEG-2 decoder 810 and the World Wide Web browser 816 in a combiner 812 which provides a variety of video display output formats 820 to a television monitor (not shown). Common applications for combined video displays include picture in picture, split screen, transparent overlays and the like. Note that any industry standard World Wide Web browser 816 may be used to display Web pages. The use of standard HTML format Web pages in MPEG-2 digital TV format permits the settop 800 to simultaneously display 812, 820 both digital TV and World Wide Web pages using only one MPEG-2 decoder 810.

Figure 6:
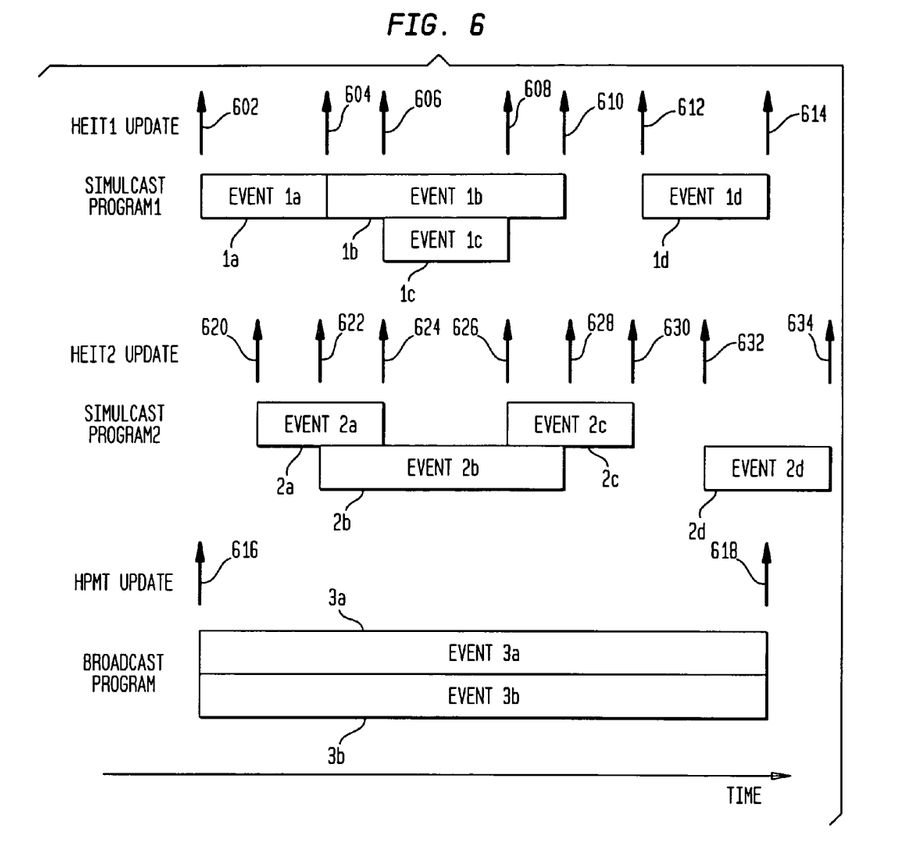
FIG. 6 is a timing diagram illustrating the relationship between broadcast video, broadcast HTML Web pages, and simulcast HTML Web pages used in the generation and updating of the HTML Event Information Table in accordance with the present invention.

The model for delivery and updating of the control map is shown in FIG. 6. The basic component of the control map protocol is an "event". Each event has a start time and an end time for broadcasting. For each event there is an event home page and multiple World Wide Web pages (defined by respective URLs) that are linked from the event home page. In addition, each event has a refresh time that specifies the refreshing period of the URLs in the event. The refresh period is the time interval between changes made to the URLs during an event.

The content providers (programmers) provide lists of events to be broadcast. Each event includes a list of URLs starting with a home page. The event is submitted from the content provider to the application server (computer) located in the headend 10 in FIG. 1. The events are stored in the application server in an event table that relates the event to the simulcast HTML Web pages. The headend 10 packages the data into multiple MPEG output packet streams and generates the corresponding control map. The set-top 38 receives the complete HTML data and control map and navigates through the contents.

As shown in FIG. 6, a program is composed of multiple events. The events can be overlapped in start time and end time. One or more events can be linked to a particular broadcast TV program.

There are Two Types of Events/program:
1. Broadcast Event/Program: Events that are associated with all the TV channels and have infinite duration are called broadcast events. Although the present embodiment illustrates one broadcast program, multiple broadcast events forming multiple broadcast programs are also possible.
2. Simulcast Event/Program: Events that are associated with a particular TV program are simulcast events. Multiple overlapped events form a simulcast program. The present embodiment illustrates one simulcast program associated with each video channel.

In FIG. 6, a first simulcast program (HEIT 1) is composed of event 1*a*, followed by event 1*b*. During and contained within event 1*b* is event 1*c*. Following the completion of event 1*b* and some time thereafter is event 1*d*. The control map stored in the settop is kept current. Each time an event changes the control map, the settop downloads an updated control map. Updating the version number in the HPAT signals the settop that a change to the control map has occurred.

Accordingly, HEIT 1 is updated at time 602 for event 1*a* and at time 604 for event 1*b*. HEIT 1 is also updated at times, 606 and 608, which correspond to the beginning and end of event 1*c*. Finally, HEIT is updated at times, 612 and 614, which correspond to the beginning and end of event 1*d*.

The flexible nature of the event-based control map structure is illustrated by a second simulcast program (HEIT 2) in FIG. 6. The second simulcast program is composed of event 2*a*, which begins and ends before event 2*c*. Bridging the gap between events 2*a* and 2*c* is event 2*b*, which begins during event 2*a* and ends during event 2*c*. Event 2*d* follows after the end of event 2*c*.

Accordingly, HEIT 2 is updated at times 620 and 624 for event 2*a*, times 622 and 628 for event 2*b*, and times 626 and 630 for event 2*c*. Finally, HEIT 2 is updated at time 632 and 634 for event 2*d*. The flexible nature of event scheduling means that simulcast Web pages can be easily added and removed as they relate to the constantly changing broadcast digital video content.

Each event is a time period during which the broadcast video program is linked to an HTML Web page defined during the event. Thus, by changing events over time, different HTML pages are linked to the broadcast video program at different times. In such manner, HTML Web pages are synchronized to the content of the broadcast video program.

An event synchronized to a program of infinite duration is a broadcast Web page. Broadcast Web pages are shown in FIG. 6 as events 3*a* and 3*b* having potentially infinite duration, or are at least stable for relatively long periods of time. Broadcast events do change, when new Web sites are added, or old Web sites dropped from the broadcast Web page lineup. Accordingly, the HPMT changes at time 616 to begin broadcast events 3*a* and 3*b* and again at time 618 to end the broadcast of events 3*a* and 3*b*.

Figure 7:
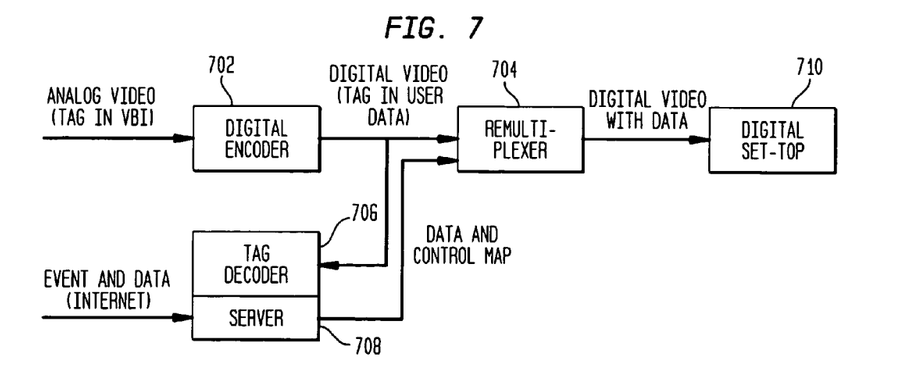
FIG. 7 is a block diagram for simulcast Web pages using a local tag at the headend to generate an HTML Event Information Table in accordance with the present invention.

For events that are known, but cannot be scheduled in advance, a local tag is used. The local tag is local in the sense that it is used in the headend, to signal the beginning of a simulcast event, and is not necessarily used globally. FIG. 7 illustrates the handling of local tags.

In FIG. 7, an analog video signal is input to a digital encoder. The output of the digital encoder is input to remultiplexer 704. The digital decoder 704 also detects a received tag (a local tag) in the VBI (vertical blanking interval) of the incoming signal. A tag decoder 706 detects the arrival of the local tag, and a headend server 708 generates the HTML data and control map to remultiplexer 704.

In operation, in advance of a simulcast program, the content provider 42 sends event data (but without timing information) and a local tag to the headend 10 in FIG. 1 via the Internet 46. A local tag in the VBI of the received analog video supplies timing information. When the local tag is detected in the received analog video VBI, the server 708 (in FIG. 7) generates the appropriate control map including a new HEIT and an updated HPAT with a new version number. (Server 708 in FIG. 7 corresponds to computer 32 in FIG. 1). In such manner the headend can respond to changing simulcast events without advanced scheduling.

Generation and Transmission of the Control Map

The generation and transmission of the control map is synchronized with the actual event start, event refresh, and event end. The rule is that the control map exactly reflects the current status of the active events. The configuration of the broadcast and simulcast programs is set ahead of time. Therefore, the HPAT is generated through a pre-determined configuration file in the headend 10 of FIG. 1.

Generation and Transmission of the HPAT

The parameters for HPAT are read from a configuration file in the headend periodically. The information in the configuration file is used to configure the control map PID and program information. The information carried on HPAT includes the pre-determined PIDs of the control map HPMT for the broadcast program and each of a plurality of control maps HEIT 1, HEIT 2 etc., one HEIT for each simulcast program. The configuration file and the HPAT for broadcast or simulcast programs also determine program information such as programType or programID (defined in the tables below).

Any change of the HPAT configuration file is detected in the settop and the stored tables therein updated automatically. A new HPAT is transmitted by incrementing the version number by one. The settop detects an increase in the version number. The change of the HPAT reflects the actual change in location of the other control maps. For example, after the change of PID of HPMT in HPAT, the control map HPMT is transported in the new PID immediately after the new HPAT is transmitted.

Generation and Transmission of the HPMT/HEIT

The parameters for HPMT/HEIT are derived from event/stream attributes. Parameters are updated whenever the event is created, refreshed, or deleted. In addition, parameters are continuously broadcast over the low bandwidth channels.

There is only one HPMT for one broadcast program. Each broadcast program carries multiple streams. Each stream is carried on a single PID as indicated in the control map, HPMT. The generation of TableID and/or TableIDext for each event is done on the per PID basis. The event with eventType (defined in the tables below) equal to broadcast is controlled by the HPAT.

There are many HEITs for multiple simulcast programs. Only one HEIT is needed for one TV channel simulcast program. The programID field identifies each simulcast program. Each simulcast program carries multiple events. The association of event to the simulcast program is identified through the eventType and programID fields in the event attributes. Each event is carried on a single PID as indicated in the control map HPMT. The generation of TableID and/or TableIDext for each event is done on the per PID basis.

If the event or stream is refreshed, it will be reflected in the refreshTime field in the event attributes that are defined in the table below. For each refresh, a new control map is updated and transmitted.

Event/Stream/URL in the Control Map

The following rules apply to the event/stream description in the control map. Each URL is for the complete Web page. The files within the page are not separated as URLs, but are part of the page data and described in a header files from Proxy. The $1^{st}$ URL in the stream/event is the home URL for the particular stream/event. If the Hash Table method is used, then it will be applied on the per event/stream basis. Within each event/stream, the order of URLs does not matter.

If the eventType indicates the broadcast type and master home page, this event is a special page that is the master home page of the broadcast programs. This event shall be carried in the $1^{st}$ stream of the HPMT. Within each event/stream (PID), the assignment of TableIDext shall start always from 0 and increment through the list of URLs in the event/stream.

The protocol of the present invention is defined in further detail by the following six tables. In summary, the tables below set forth the syntax by which HPAT, HPMT and HEIT form the control map to navigate among the HTML pages of the rotating carousel. The six tables are:

Table 1. Data Section
Table 2. Event/Stream Attributes
Table 3. HPAT
Table 4. HPMT
Table 5. HEIT
Table 6. URL descriptor

TABLE 1

Structure of the Data Section

| Syntax | No. of Bits | Value |
|---|---|---|
|  | 8 | User defined |
| Data_section( ) | 1 | "1" |
| { | 1 | user defined |
|    table_id | 2 | "11" |
|    section_syntax_indicator | 12 | section defined |
|    private_indicator | 16 | user defined |
|    reserved | 2 | "11" |
|    private_section_length | 5 | user defined |
|    table_id_extension | 1 | user defined |
|    reserved | 8 | section maintained |
|    version_number | 88 | section maintaineddata |
|    current_next_indicator |  |  |
|    section_number | 32 | section maintained |
|    last_section_number |  |  |
|    for (I=0; i<private_section_length−9; i++) |  |  |
|    { |  |  |
|       HTML or IP_datagram_byte |  |  |
|    } |  |  |
|    CRC_32 |  |  |
| } |  |  |

PID: The PID (packet identifier) is the 13 bit Packet ID used to identify the stream at the MPEG-2 transport packet layer.

| PIP value | Description |
| --- | --- |
| 0x0000 | program_association_section |
| 0x0001 | CA_section |
| 0x0002 to 0x000F | ISO reserved |
| 0x0010 to 0x001F | DVB defined |
| 0x0020 to 0x1FFE | User defined (MoreCom) |
| 0x1FFF | Null packet |

The table_id field is an 8 bit field to specify the type of section used. The following values of table_id are assigned at this moment.

| Table_id value | Description |
| --- | --- |
| 0x00 | program_association_section |
| 0x01 | CA_section |
| 0x02 | program_map_section |
| 0x03–0x3F | ISO reserved |
| 0x40–0x7F | DVB defined |
| 0x80–0Xfe | User defined (MoreCom) |
| 0xFF | Forbidden | descriptor_tag

| Table_id value | Description |
| --- | --- |
| 0x00 to 0x3F | ISO defined |
| 0x40 to 0x7F | DVB defined |
| 0x80 to 0xFE | User defined (MoreCom) |
| 0xFF | Forbidden |

TABLE 2

Definition of Event/Stream Attributes

| Field | Data Type | Assigned by | Comments |
| --- | --- | --- | --- |
| EventID | int32 | Server | Unique ID generated by the headend server for each event. The eventID can be reused once the event end time is reached. At each time, the eventID is unique across all the events for all the video channels per headend. |
| CommandID | int8 | Server | "0" new event<br>"1" refresh existing event<br>"2" delete existing event |
| EventType | int8 | Provider | "0" for broadcast with all the programs. In this case, the programID is for broadcast data programID. (Default is equal to 0)<br>"1" for simulcast (non-tag based) for pre-scheduled event.<br>"2" for tag based, broadcast but wait to be activated by the tag either at headend or set-top.<br>(This is the lower 8 bit of the iType passed by the service manager)<br>"3" for master home page event for broadcast |
| ProviderID | int16 | Server | Upon submission of the name of the provider ("CNN"). The server in each headend will assign a providerID that is unique per headend |
| ProgramID | int16 | Server | Upon submission of the name of TV program of the provider "CNN-fn". In the simulcast case, the server in each headend will assign the video program number (programID) to the event. If eventType = 0, this field is set to 0 as default broadcast program. |
| StartTime | time_t | Provider | The start time of the event assigned by the Provider. |
| Duration | int32 | Provider | The duration of the event in second. |
| RefreshTime | time_t | Server | The refresh time of the last refresh. This indicates the loading time of the current contents from the Internet. This is the only field to be added and updated from MoreGate event manager |
| RefreshRate | int32 | Provider | The refresh period of the contents in seconds. It is up to the server to meet this target. |
| UrlCount | int16 | Provider | The count of URLs in this event. Total of 64k URLs are allowed in one event. In addition, the 1st URL is defined as the home page for the event. |
| UrlName | char** | Provider | The pointer to multiple character strings defining the list of URLs in the event. Currently, each URL name is less than 255 bytes and /0 terminated. |

TABLE 2-continued

Definition of Event/Stream Attributes

| Field | Data Type | Assigned by | Comments |
|---|---|---|---|
| struct *urlFile { urlFileName | wchar* | Server | The pointer to character strings defining the file associated with each URL in the event. This is part of the structure array. There is one to one correspondences between the URL and file name. |
| UrlFileSize } | int32 | Server | File size of the urlFile. This is part of the structure array. This indicates the file size of the urlFile. |

Notes:
1. For the unique broadcast program and any new request of an event with a new programID, a single HTML Program Association Table is generated and updated. Each transport stream has only one HTML Program Association Table to describe all the data programs and their corresponding HTML Program Map Table (broadcast) or Event Information Table (simulcast).
2. The default Packet ID carrying the HTML Program Association Table is defined as 0x1F00.
3. Each HTML Program Map Table (for broadcast of HTML web pages) and each HTML Event Information Table (for simulcast of HTML web pages) is carried over a Packet ID that is specified in the HTML Program Association Table. In addition, HTML Program Association Table indicates the program type and channel link.

2. transport_stream_ID: use any for one transport stream. MPEG-2 transport in each 6 MHz has different transport_stream_ID value
3. version_number: starting from value 0, increment when there is an updated version with a new or different program.
4. programType: use 0 for broadcast, use 1 for simulcast. Determined from event attributes.
5. providerID: use the same from event attributes
6. programID: use the same from event attributes (set to 0 for broadcast, video program number for simulcast)
7. HPAT_PID (HEIT_PID): Packet ID for the corresponding HTML Program Map Table (HPMT) or HTML Event Information Table (HEIT).

TABLE 3

Structure of the HTML Program Association Section

| Syntax | No. of Bits | Value |
|---|---|---|
| | 8 | MoreCom defined "0xF0" |
| HTML_Program_Association_Section( ) | 1 | "1" |
| { | 1 | |
| tableID | 2 | "11" |
| section_syntax_indicator | 12 | section maintained |
| "0" | 16 | user defined (s) |
| reserved | 2 | "11" |
| section_length | 5 | user defined (s) |
| transport_stream_ID | 1 | "1" |
| reserved | 8 | section maintained |
| version_number | 88 | section maintaineduser defined (a) |
| current_next_indicator | 16 | user defined (a) |
| section_number | 16 | user defined (a) |
| last_section_number | 16 | user defined (s) |
| for (I=0; i<number_of_program; i++) | | |
| { | 32 | section maintained |
| programType | | |
| providerID | | |
| programID | | |
| HPMT_PID (HEIT_PID) | | |
| } | | |
| CRC_32 | | |
| } | | |

Notes: Except as otherwise indicated below, the field formats having the same name designations as in the MPEG-2 standard have the same definitions as in the MPEG-2 standard. Additions to the standard MPEG-2 designations to implement the present invention are set forth below:

1. tableID: use default value of 0xF00 for HTML Program Association Table

8. For programType=Broadcast in the HTML Program Association Table, the associated Program Map Table is used. The broadcast program is composed of multiple streams. (Each stream is defined as an event with infinite duration).

9. The Packet ID carrying the HTML Program Map Table or HTML Event Information Table is specified in the HTML Program Association Table.

TABLE 4

Structure of the HTML Program Map Section

| Syntax | No. of Bits | Value |
|---|---|---|
|  | 8 | MoreCom defined "0xF1" |
| HTML_Program_Map_Section( ) | 1 | "1" |
| { | 1 |  |
|   tableID | 2 | "11" |
|   section_syntax_indicator | 12 | section maintained |
|   "0" | 16 | user defined (a) |
|   reserved | 2 | "11" |
|   section_length | 5 | user defined (s) |
|   programID | 1 | "1" |
|   reserved | 8 | section maintained |
|   version_number | 832 | section maintaineduser defined (a) |
|   current_next_indicator | 8 | user defined (a) |
|   section_number | 16 | user defined (a) |
|   last_section_number | time_t | user defined (a) |
|   for (i=0; i<number_of_stream i++) | 32 | user defined (a) |
|   { | 8 | user defined (s) |
|     streamID | time_t | user defined (a) |
|     streamType | 32 | user defined (a) |
|     streamPID | descriptor | user defined (a, s)section maintained |
|     startTime | _length*8+24 |  |
|     duration |  |  |
|     runningStatus | 32 |  |
|     refreshTime |  |  |
|     refreshRate |  |  |
|     url_descriptor ( ) |  |  |
|   } |  |  |
|   CRC_32 |  |  |
| } |  |  |

Notes:
1. tableID: use default value of 0x1F00 for HTML Program Map Table.
2. programID: same as defined in the stream attributes. In the broadcast case, it is always set to 0 for broadcast program to every channel.
3. version_number: starting from value 0, increment when there is an updated version when (1) stream is added (2) stream is refreshed (3) stream is deleted.
4. streamID: same as defined in broadcast stream attributes
5. streamType: same as specified by stream attributes. It is 0 for broadcast. It is 3 for master home page that should be broadcast as the 1$^{st}$ stream.
6. streamPID: same as specified by stream attributes. Every stream has different Packet ID.
7. starttime: same as specified by stream attributes.
8. duration: same as specified by stream attributes.
9. runningStatus: set to "1" as running, "0" as not running. Determined by streaming server
10. refreshTime: same as specified in the stream attributes.
11. refreshRate: same as specified in the stream attributes.
12. url_descriptor: determined by both application and streaming server (see table 6 below which defines the URL descriptor)
13. For programType=Simulcast in the HTML Program Association Table, the associated Event Information Table is used. The simulcast program is composed of multiple events. And each simulcast program is associated with each video channel (programID).
14. The Packet ID carrying the HTML Program Map Table or HTML Event Information Table is specified in the HTML Program Association Table.

TABLE 5

Structure of the HTML Event Information Section

| Syntax | No. of Bits | Value |
|---|---|---|
|  | 8 | MoreCom defined "0xF2" |
| HTML_Event_Information_Section( ) | 1 | "1" |
| { | 1 |  |
|   tableID | 2 | "11" |
|   section_syntax_indicator | 12 | section maintained |
|   "0" | 16 | user defined (a) |
|   reserved | 2 | "11" |
|   section_length | 5 | user defined (s) |
|   programID | 1 | "1" |
|   reserved | 8 | section maintained |
|   version_number | 832 | section maintaineduser defined (a) |
|   current_next_indicator | 8 | user defined (a) |

TABLE 5-continued

Structure of the HTML Event Information Section

| Syntax | No. of Bits | Value |
|---|---|---|
| section_number | 16 | user defined (a) |
| last_section_number | time_t | user defined (a) |
| for (i=0; i<number_of_event; i++) | 32 | user defined (a) |
| { | 8 | user defined (s) |
| eventID | time_t | user defined (a) |
| eventType | 32 | user defined (a) |
| eventPID | descriptor _length*8+24 | user defined (a, s)section maintained |
| startTime | | |
| duration | | |
| runningStatus | 32 | |
| refreshTime | | |
| refreshRate | | |
| url_descriptor ( ) | | |
| } | | |
| CRC_32 | | |
| } | | |

Notes:
1. tableID: use default value of 0xF2 for HTML Event Information Table.
2. programID: same as defined in the stream attributes. In the simulcast case, it is always set to the associated video program number.
3. version_number: starting from value 0, increment when there is an updated version when (1) event is added (2) event is refreshed (3) event is deleted.
4. eventID: same as defined in the event attributes
5. eventType: same as specified by event attributes. It is 1 for regular simulcast, 2 for tag based simulcast that requires receiving the tag with home URL by the set-top or activated by the server (startTime and duration will be neglected if tag is used).
6. eventPID: same as specified by event attributes. Every event has different Packet ID.
7. starttime: same as specified by event attributes.
8. duration: same as specified by event attributes.
9. runningStatus: set to "1" as running, "0" as not running. Determined by streaming server
10. refreshTime: same as specified in the event attributes.
11. refreshRate: same as specified in the event attributes.
12. url_descriptor: determined by both application and streaming server (see table 6 below which defines the URL descriptor)

TABLE 6

Structure of the URL Descriptor

| Syntax | No. of Bits | Value |
|---|---|---|
| | 8 | MoreCom defined |
| URL_descriptor( ) | 16 | user defined (s) |
| { | 16 | user defined (a) |
| descriptor_tag | | |
| descriptor_length | variable | user defined (a) |
| urlCount | 8 | user defined (s) |
| for (j=0; j<urlCount; j++) { | 16 | user defined (s) |
| urlName | | |
| urlTableID | | |
| urlTableIDext | | |
| } | | |
| } | | |

Notes:
1. descriptor_tag: use default value of 0xEE for url_descriptor.
2. descriptor_length: determined by the total number of bytes in the descriptor that follows the descriptor_tag field. This can be used to skip stream/event.
3. urlCount: same as specified in the stream/event attributes.
4. urlName: same as defined in the stream/event attributes (variable length character string that ends with /0), The $1^{st}$ URL is always the home of the event/stream.
5. urlTableID: assigned by streaming server. Unique within a Packet ID
6. urlTableIDext: assigned by streaming server. Unique within a Packet ID

What is claimed is:

1. In a one way broadcast communications network including a broadcasting station for transmitting on a broadcast medium broadcast programming from at least one content provider, and a settop decoder coupled to said broadcast medium, said broadcasting station including an Internet access server for retrieving World Wide Web pages in HTML format, said broadcast communications network further including a multi-channel digital television signal formatted into a plurality of MPEG data packets, each of said of said plurality of MPEG data packets being identified by a respective packet identifier, a method for distributing World Wide Web pages over said one way broadcast communications network, said method comprising:
    storing World Wide Web (WWW) pages in HTML format at said broadcasting station to form a plurality of stored HTML Web pages, said WWW pages including pages associated with said broadcast programming;
    formatting said plurality of stored HTML Web pages into MPEG data packets while retaining said HTML format;
    contemporaneously transmitting said MPEG data packets and said associated broadcast programming in said digital television signal over said one way broadcast communications network;
    receiving said MPEG data packets at said settop decoder, said MPEG data packets including said plurality of HTML Web pages; and
    selecting at said settop decoder, at least one of said received plurality of HTML Web pages in said HTML format for display.

2. The method of claim 1, further comprising:
receiving, from corresponding content providers, web page addresses of the WWW pages associated with said broadcast programming of said content providers.

3. The method of claim 2, wherein:
each content provider controls the WWW pages available to the settop decoder by controlling the web page addresses associated with its broadcast programming.

4. The method of claim 3, wherein:
said web page addresses are adapted by said content providers in response to changes in broadcast programming provided to said broadcasting station.

5. The method of claim 1, wherein:
said settop decoder communicates with said broadcasting station via a return path, said return path enabling settop decoder selection of content, said selected content being associated with a corresponding WWW page.

6. The method of claim 5, wherein:
said return path comprises one of a two way cable television (CATV) path and a telephone path.

7. The method of claim 1, further comprising:
generating a control map defining the correspondence between the packet identifiers of said MPEG data packets and respective ones of said plurality of stored HTML Web pages;
formatting said control map and said plurality of stored HTML Web pages into MPEG data packets while retaining said HTML format;
receiving said MPEG data packets at said settop decoder, said MPEG data packets including said plurality of HTML Web pages and said control map; and
selecting at said settop decoder, responsive to said control map, at least one of said plurality of HTML Web pages in said HTML format for display.

8. The method of claim 7, wherein said control map further comprises a first table and a second table, said method further comprising:
transmitting said first table in an MPEG data packet corresponding to a predetermined packet identifier; and
transmitting said second table in an MPEG data packet having a packet identifier specified in said first table.

9. The method of claim 8, further comprising:
receiving said first table in said MPEG data packet con-esponding to said predetermined packet identifier;
receiving said second table in said MPEG data packet having said packet identifier specified in said first table; and
selecting at said settop decoder, responsive to said second table, at least one of said plurality of HTML Web pages in said HTML format for display.

10. A method of controlling internet access of a settop decoder, said settop decoder adapted to receive MPEG data packets via a broadcast medium, said MPEG data packets including broadcast programming and World Wide Web (WWW) pages in HTML format associated with said broadcast programming, said method comprising:
receiving, from providers of said broadcast programming, web page addresses of the WWW pages associated with said broadcast programming of said content providers; and
contemporaneously including addressed WWW pages with corresponding broadcast programming;
wherein said settop decoder is enabled to navigate among those WWW pages provided via said broadcast medium.

11. The method of claim 10, wherein:
each of a plurality of content providers controls the WWW pages associated with its respective broadcast programming.

12. The method of claim 10, wherein:
the settop decoder communicates with the broadcasting station via a return path, the return path enabling settop decoder selection of content, the selected content being associated with a corresponding WWW page.

13. The method of claim 12, wherein:
the return path comprises one of a two way cable television (CATV) path and a telephone path.

14. The method of claim 10, further comprising:
generating a control map defining the correspondence between the packet identifiers of said MPEG data packets and respective ones of said plurality of stored HTML Web pages;
formatting said control map and said plurality of stored HTML Web pages into MPEG data packets while retaining said HTML format;
receiving said MPEG data packets at said settop decoder, said MPEG data packets including said plurality of HTML Web pages and said control map; and
selecting at said settop decoder, responsive to said control map, at least one of said plurality of HTML Web pages in said HTML format for display.

15. The method of claim 14, wherein said control map further comprises a first table and a second table, said method further comprising:
transmitting said first table in an MPEG data packet corresponding to a predetermined packet identifier; and
transmitting said second table in an MPEG data packet having a packet identifier specified in said first table.

16. The method of claim 15, further comprising:
receiving said first table in said MPEG data packet corresponding to said predetermined packet identifier;
receiving said second table in said MPEG data packet having said packet identifier specified in said first table; and
selecting at said settop decoder, responsive to said second table, at least one of said plurality of HTML Web pages in said HTML format for display.

* * * * *

UNITED STATES PATENT AND TRADEMARK OFFICE
CERTIFICATE OF CORRECTION

PATENT NO. : 7,096,484 B2  Page 1 of 1
APPLICATION NO. : 10/259347
DATED : August 22, 2006
INVENTOR(S) : Weidon Mao et al.

It is certified that error appears in the above-identified patent and that said Letters Patent is hereby corrected as shown below:

Column 21, Line 45, Claim 9:

Delete "con-esponding" and insert therefor -- corresponding --.

Signed and Sealed this

Third Day of April, 2007

JON W. DUDAS
*Director of the United States Patent and Trademark Office*